United States Patent

Senese

[11] Patent Number: 6,029,936
[45] Date of Patent: Feb. 29, 2000

[54] DECORATIVE FISHBOWL STAND

[76] Inventor: Vincent J. Senese, 541 Pease La., West Islip, N.Y. 11795

[21] Appl. No.: 08/686,497

[22] Filed: Aug. 22, 1996

[51] Int. Cl.⁷ .................................................... A47G 23/02
[52] U.S. Cl. ......................... 248/146; D30/101; 119/253; 119/269
[58] Field of Search .......................... 248/146; D30/101, D30/102, 103, 104; 119/253, 256, 269

[56] References Cited

U.S. PATENT DOCUMENTS

| | | | |
|---|---|---|---|
| D. 130,666 | 12/1941 | Nichol | D30/101 X |
| D. 136,064 | 7/1943 | Fordyce | D30/101 X |
| D. 183,463 | 9/1958 | Mallamace | D30/102 |
| D. 285,129 | 8/1986 | Phillips et al. | D30/102 |
| D. 299,565 | 1/1989 | Hsu | D30/102 |
| D. 311,264 | 10/1990 | Stramel | D30/101 |
| D. 349,979 | 8/1994 | Ulloa et al. | D30/101 |

OTHER PUBLICATIONS

Advertisement for Antique Regency Aquarium, W & J Sloane, Vogue, p. 51, Feb. 1939.
"Timmy and Tummy" aquaria, Decorative Lamp Co., H. H. Turchin Co., Oct. 1949.

Company 2000 catalog, Jan. 1992 Collection, p. 29.

*Primary Examiner*—William Stryjewski
*Attorney, Agent, or Firm*—Galgano & Burke

[57] ABSTRACT

A stand for supporting a fishbowl thereon in which the stand includes a base, a support surface for supporting at least a portion of a bottom of the fishbowl, and at least one upwardly extending portion attached to said base which is positioned and dimensioned to extend about and around at least a side portion of a fishbowl placed on the support surface. At least one of the base and the upwardly extending portion simulate a three-dimensional pictorial representation, such as a landscape or aquatic scene, individual, object, or a combination thereof, in which a fishbowl placed on the support surface is incorporated. Preferably, the support surface is disposed in an elevated and parallel relation relative to the base. Desirably, the upwardly extending portion extends around a portion of the lower side portion, upper side portion and top of the fishbowl.

16 Claims, 7 Drawing Sheets

DECORATIVE FISHBOWL STAND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to fishbowl stands. More particularly, the present invention relates to fishbowl stands which simulate a three-dimensional representation to decoratively support and maintain a fishbowl thereon in a stable and secure manner.

Fish tanks and aquariums are generally rectangularly-shaped and are sized so as to permit various objects, such as rocks and plants, to be placed therein for decoration, along with a number of fish.

Fishbowls, on the other hand, are typically sized smaller than fish tanks and aquariums and thus do not provide room for placing various objects therein for decoration. Because of the relatively small size, fishbowls typically only contain fish and are simply placed on a table or shelf. They are generally not particularly attractive.

Thus, there is a need for fishbowl stands in the form of a three-dimensional picture or representation to support a fishbowl in a stable and secure yet aesthetically decorative manner.

SUMMARY OF THE INVENTION

Accordingly, it is an object of the present invention to provide a decorative fishbowl stand in the form of a three-dimensional representation such as a landscape or aquatic scene, individual, object, or a combination thereof.

It is another object of the present invention to provide a decorative fishbowl stand in which the configuration of a three-dimensional representation is integral to the stand safely retaining a fishbowl thereon.

It is also another object of the present invention to provide a decorative fishbowl stand having portions thereof which surround and extend around portions of the sides of a fishbowl so as to safely retain the fishbowl.

It is still another object of the present invention to provide a decorative fishbowl stand which supports a fishbowl in an elevated position above a table or a shelf so as to permit a better viewing thereof.

Certain of the foregoing and related objects are readily obtained in a decorative fishbowl stand for supporting a fishbowl thereon in which the stand includes a base, a support surface for supporting at least a portion of a bottom of a fishbowl, and at least one upwardly extending portion attached to the base which is positioned and dimensioned to extend about and around at least a side portion of a fishbowl placed on the support surface. At least one of the base and the upwardly extending portion simulate a three-dimensional pictorial representation in which a fishbowl placed on the support surface is incorporated.

Preferably, the support surface is generally circular-shaped and the support surface is disposed an elevated position relative to the base. Also preferably, the support surface is generally flat and a bottom surface of the base are disposed in parallel relationship. Advantageously, the fishbowl stand further includes a non-slip material disposed on the base.

The upwardly extending portion extends around a lower side portion of a fishbowl, and preferably, around an upper side portions, as well as above a top of the fishbowl. Desirably, the upwardly extending portion has a surface which conforms to a side portion of a fishbowl.

Desirably, the base and upwardly extending portion are generally hollow and fabricated from a plastic material. Advantageously, the fishbowl stand also includes a plastic or glass fishbowl.

Preferably, the three-dimensional representation is in the form of a landscape setting such as a mermaid on the ocean bottom, a Swiss mountain village, a lighthouse, a pagoda, or a representation of an individual such as a wizard.

BRIEF DESCRIPTION OF THE DRAWINGS

Other objects and features of the present invention will become apparent from the following detailed description considered in connection with the accompanying drawings which disclose several preferred embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
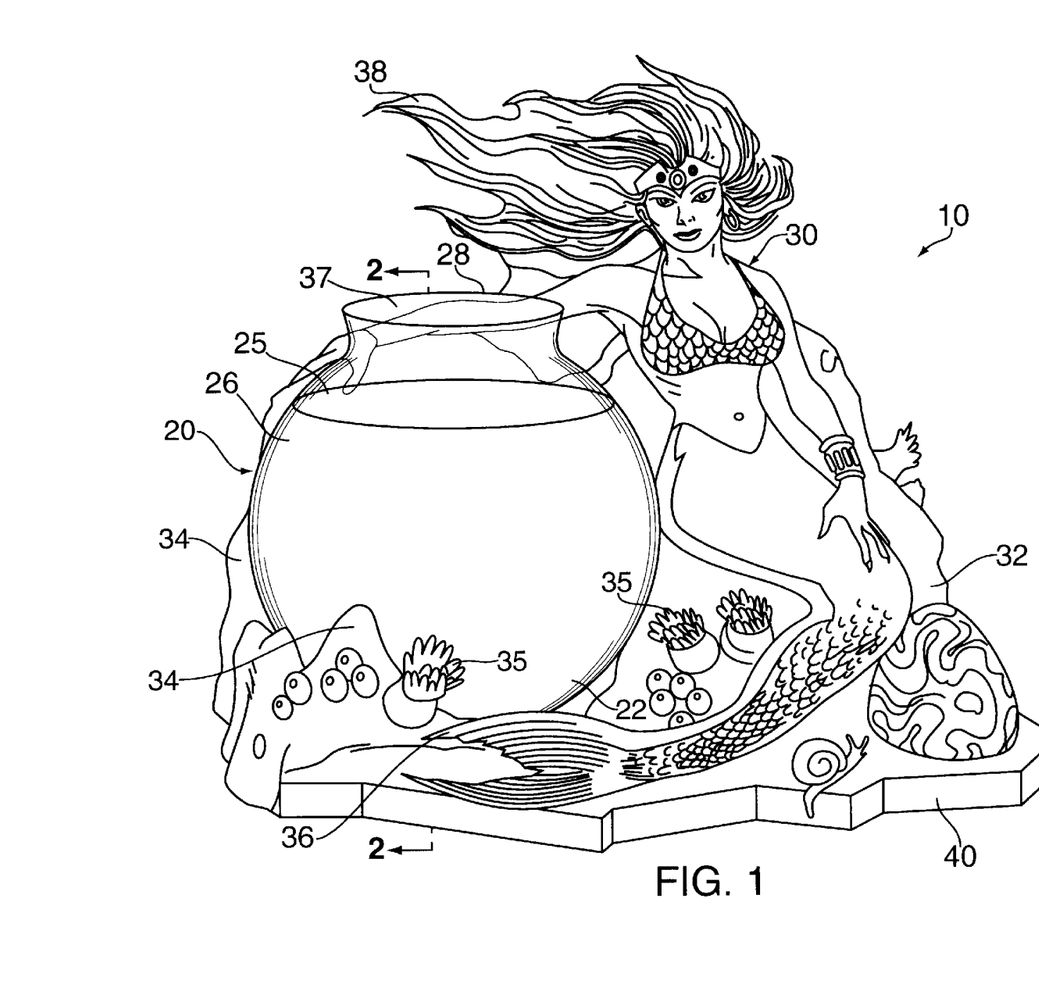
FIG. 1 is a perspective view of the present invention for a fishbowl stand in the form of a mermaid on the ocean bottom.
Figure 2:
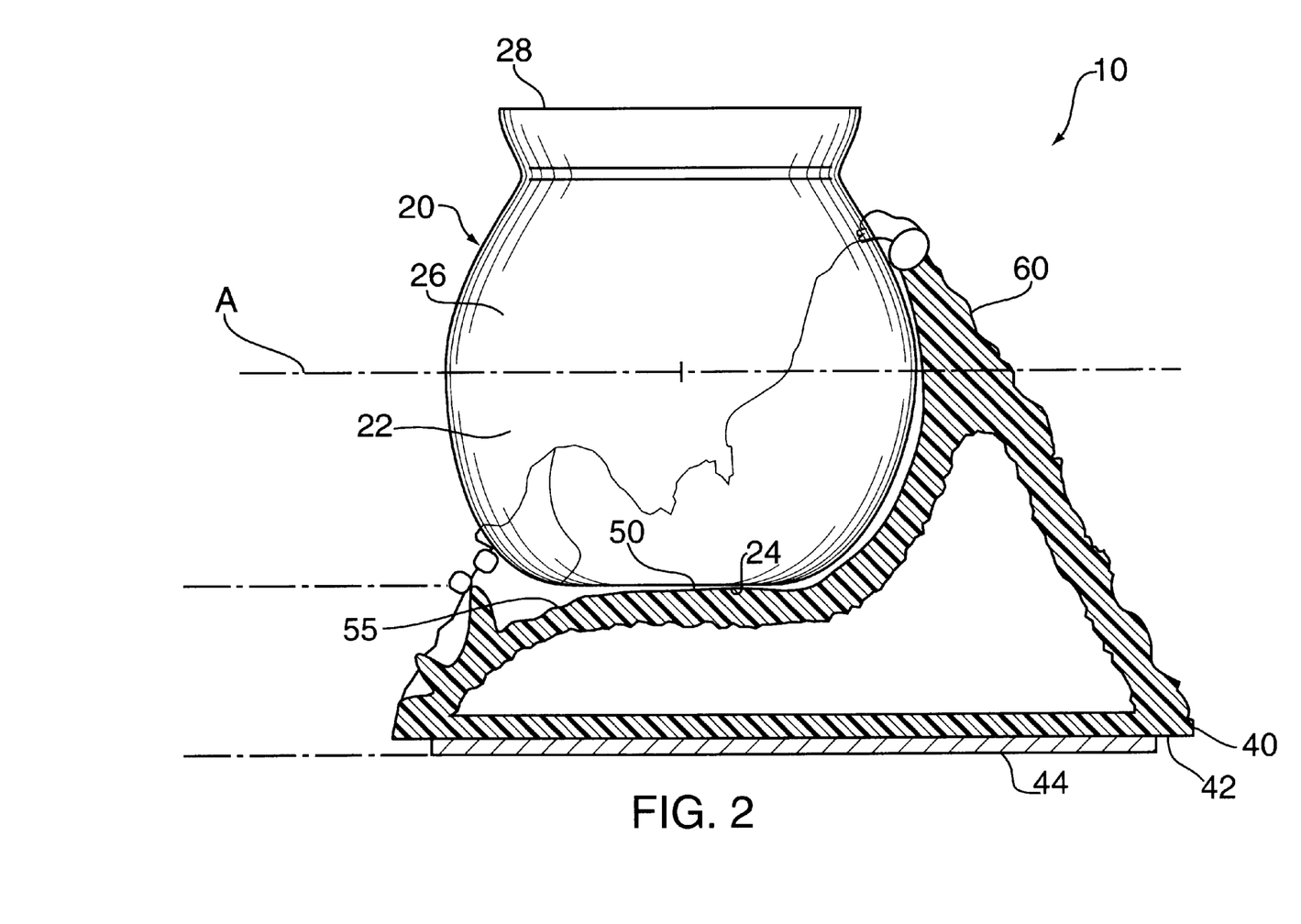
FIG. 2 is a cross-sectional view of the fishbowl stand taken along line 2—2 in FIG. 1.
Figure 3:
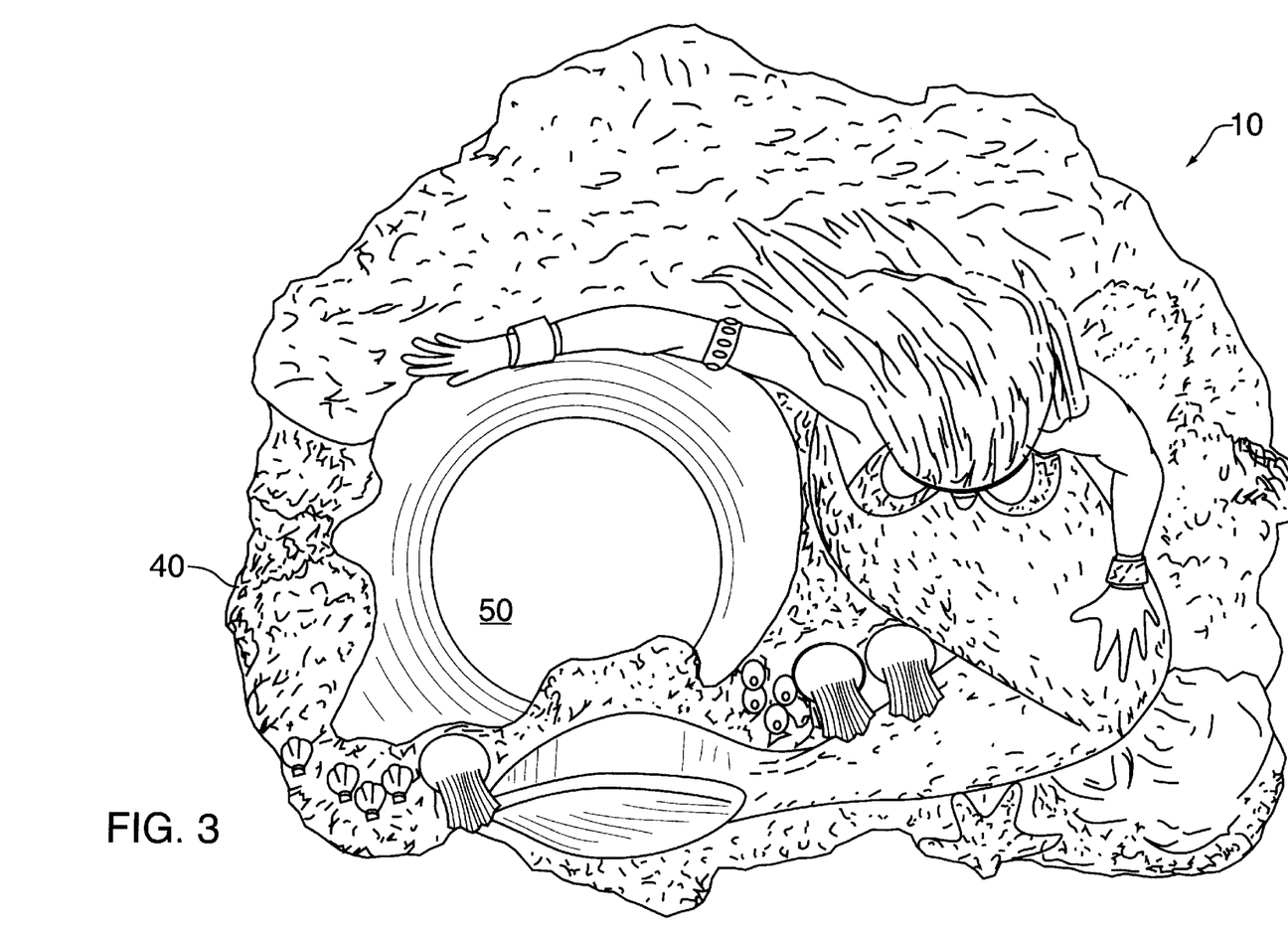
FIG. 3 is a top view of the fishbowl stand shown in FIG. 1.

Turning now in detail to the drawings, therein illustrated in FIGS. 1–3 is one embodiment of the present invention for a novel decorative fishbowl stand 10 upon which is supported a transparent plastic fishbowl 20 which typically contains water 25 and fish (not shown). As illustrated in FIG. 1, stand 10 is generally in the form of an aquatic scene. In particular, while at first glance stand 10 is in the form of a fabled mermaid 12 on the ocean floor or bottom 32, upon closer view stand 10 is specifically configured to incorporate, merge and/or blend the elements of the three-dimensional aquatic scene and the fishbowl into a fully integrated, three-dimensional, aesthetically-pleasing pictorial simulation, while at the same time supporting fishbowl 20 in a stable and secure manner. Specifically, fishbowl stand 10 is configured so that portions of ocean bottom 32, e.g., rocks 34 and barnacles 35, upwardly extend around fishbowl 20, and mermaid 12 is positioned alongside fishbowl 20. More specifically, a tail 36 of mermaid 12 extends around a lower portion 22 of fishbowl 20, an arm 37 of mermaid 12 extends around an upper portion 26 of fishbowl 20, and the hair 38 of mermaid 12, which is illustrated as being acted upon by the ocean currents, is disposed above a top 28 of fishbowl 20. In a practical sense, the upwardly extending rocks 34 and barnacles 35, and portions of the mermaid 12 serve as upwardly-extending fingers to hold the fishbowl in a secure and stable manner.

As shown in FIG. 2, fishbowl stand 10 generally comprises a generally flat bottom or base 40, a support surface 50, and an upwardly extending portion 60 which surrounds at least a portion of fishbowl 20. Base 40 has a generally flat bottom surface 42 so as to maintain fishbowl stand 10 in a generally upright and stable position on a table, desk, shelf, or other generally flat horizontal surface (not shown). Desirably, bottom surface 42 of base 40 is provided with a non-slip material 44 such as rubber and the like so that non-slip material 44 and a horizontal surface can frictionally engage one another to resist horizontal movement therebetween.

With reference to FIGS. 2 and 3, support surface 50 is generally flat and preferably generally circular-shaped so as to provide a pad or resting place for supporting at least a portion of bottom surface 24 of fishbowl 20 (FIG. 2). Desirably, support surface 50 is disposed in a spaced-apart relation relative to base 40 so as to allow a better viewing into fishbowl 20 as compared to when a fishbowl is positioned directly on a generally flat horizontal surface. As shown in FIG. 2, a cutout 55 enables one to view the interior through a portion of bottom 24 of fishbowl 20. Advantageously, support surface 50 is disposed in a generally parallel relation with base 40 so that fishbowl 20 is maintained in a level and generally upright and stable manner when fishbowl stand is disposed on a generally level surface.

Upwardly extending portion 60 preferably extends around a lower side portion 22, an upper side portion 26 of fishbowl 20, as well as above top 28 (FIG. 1) of fishbowl 20 to securely maintain fishbowl 20 on support surface 50. Specifically, upwardly extending portion 60 preferably extends above the halfway mark of fishbowl 20, represented by the axis A in FIG. 2, to better retain fishbowl 20 on support surface 50. Desirably, upwardly extending portion 60 conforms, i.e., is curved when viewed in cross-section, so as to fit against the side of fishbowl 20. Advantageously, upwardly extending portion 60 is disposed toward the rear so as to not obstruct viewing of fishbowl 20 from the front. From the present description, it will be appreciated that fishbowl 20 can be easily placed on and removed from fishbowl stand 10.

Figure 4:
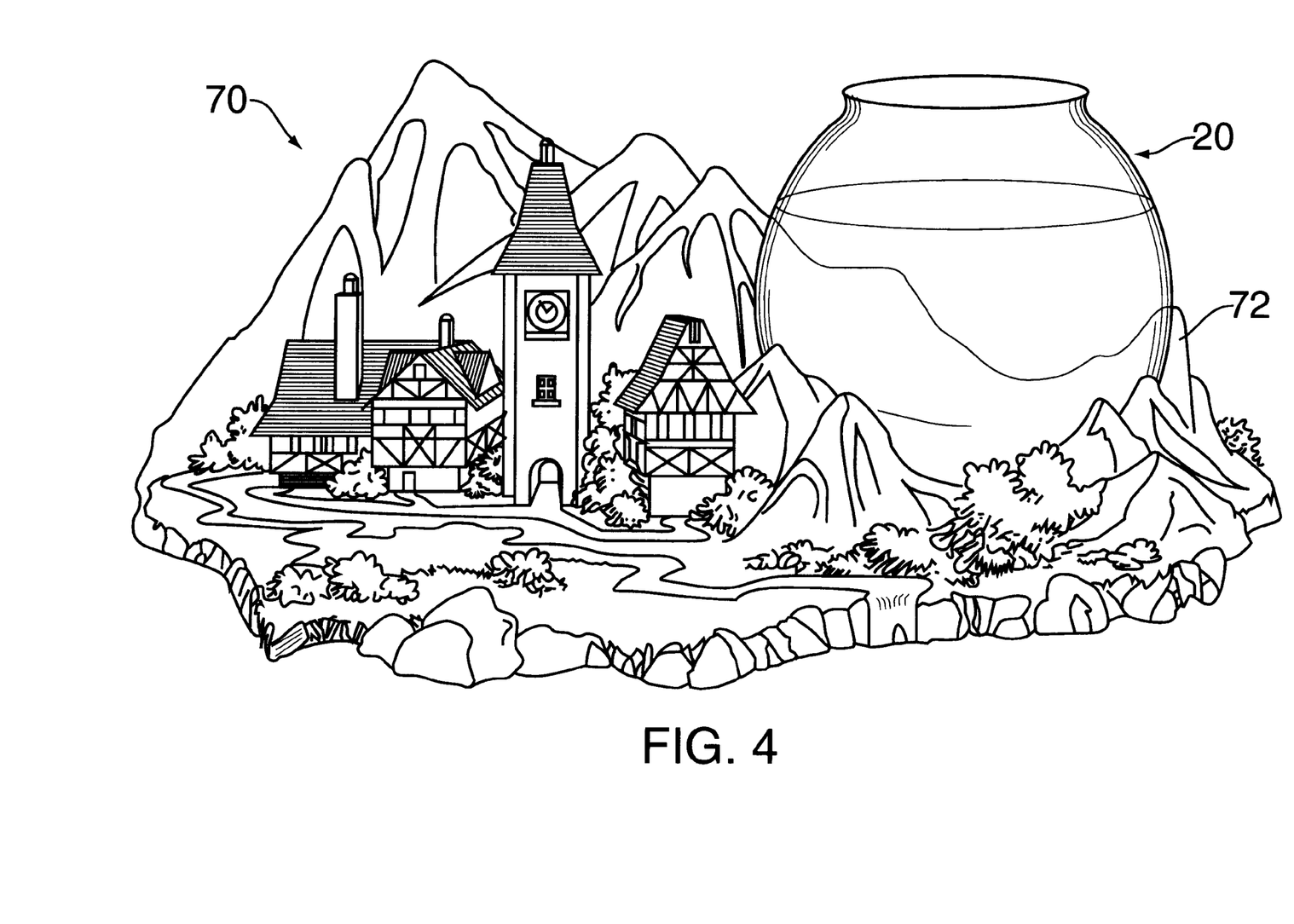
FIG. 4 is a perspective view of an alternative embodiment of the present invention for a fishbowl stand in the form of a Swiss mountain village.
Figure 5:
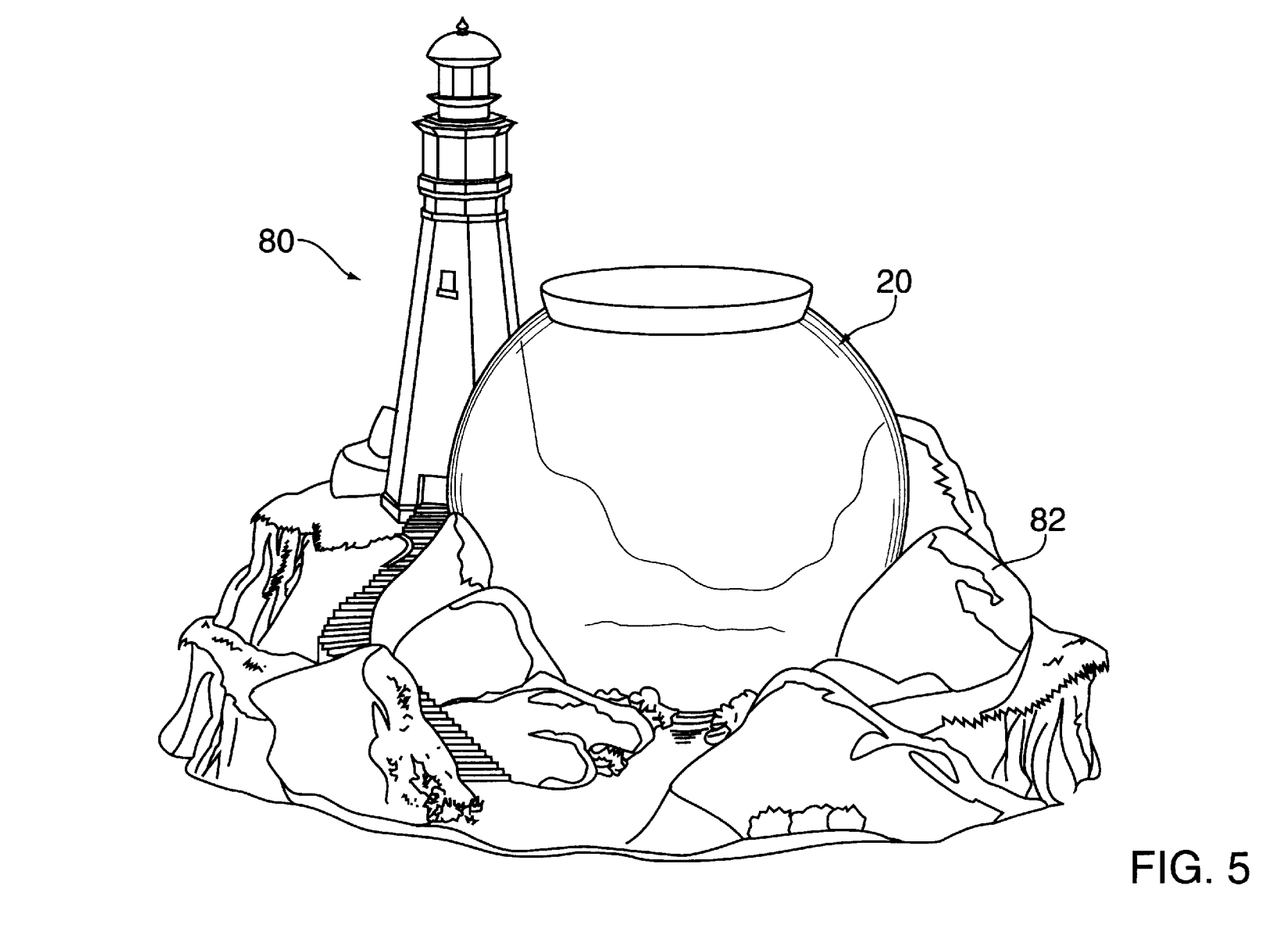
FIG. 5 is a perspective view of another alternative embodiment of the present invention for a fishbowl stand in the form of a lighthouse.
Figure 6:
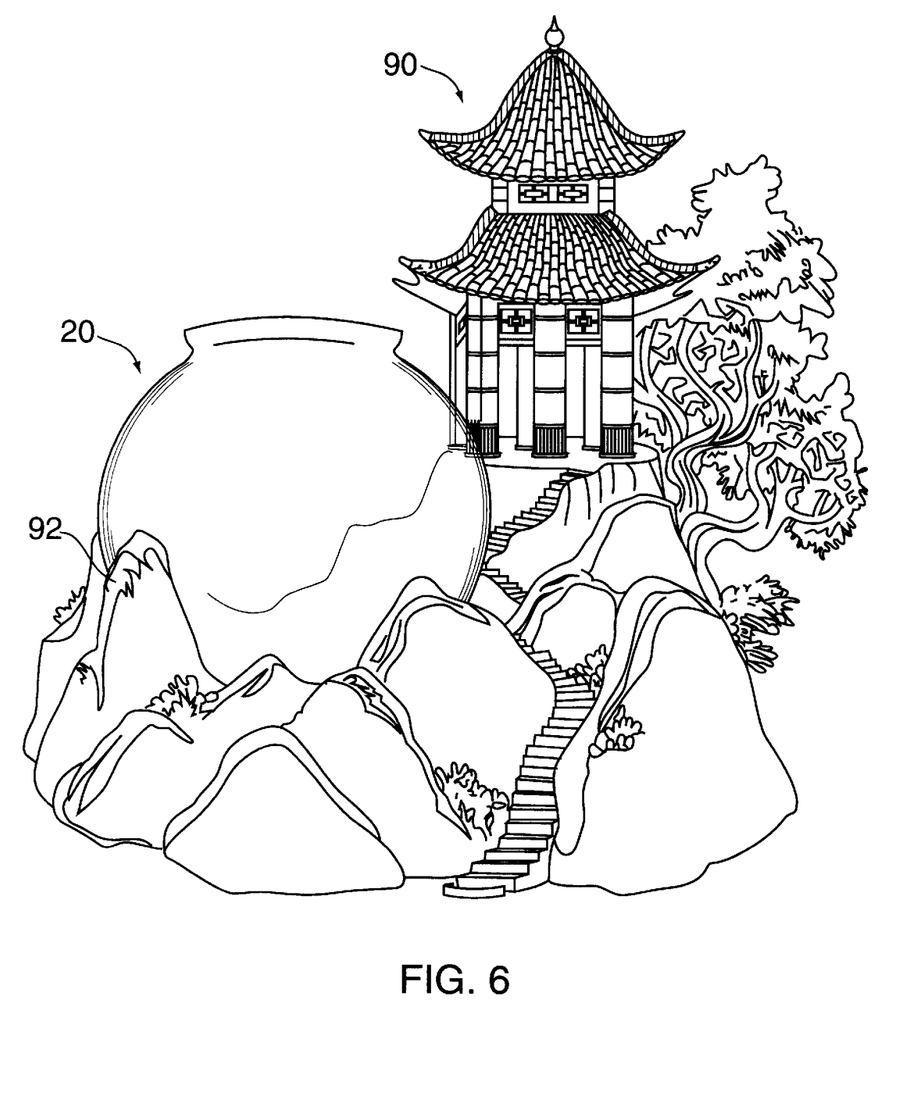
FIG. 6 is a perspective view of still another alternative embodiment of the present invention for a fishbowl stand in the form of a pagoda on a mountain.

Alternative embodiments of the present invention are shown in FIGS. 4–7. Specifically, FIG. 4 illustrates a fishbowl stand 70 in the form of a Swiss mountain village. The scene incorporates mountains 72 which extend around the sides of fishbowl 20 to safely retain the same thereon. FIG. 5 illustrates a fishbowl stand 80 in the form of a lighthouse. The scene incorporates shoreline rocks 82 which extend around and conform to the sides of fishbowl 20. FIG. 6 illustrates a fishbowl stand 90 in the form of a pagoda with portions of a mountain top 92 extending around the sides of fishbowl 20.

Figure 7A:
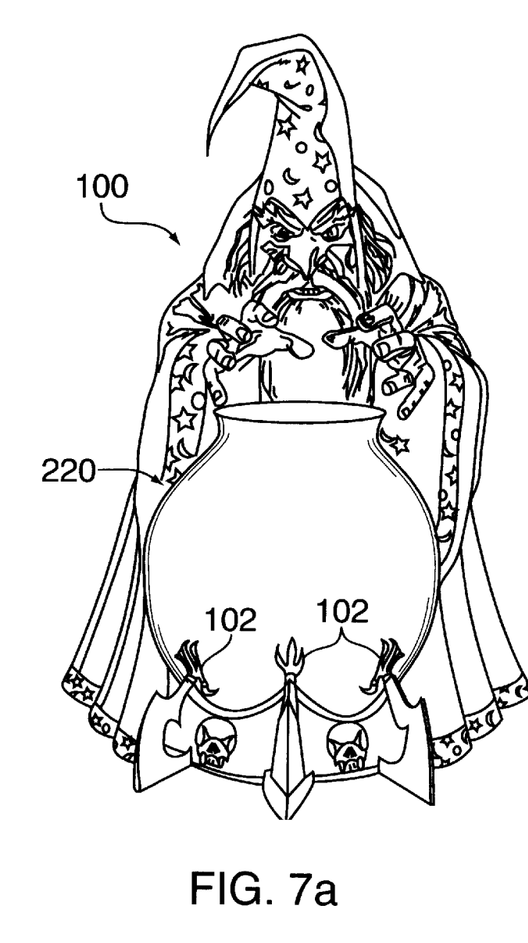
FIGS. 7a and 7b are respective front and rear perspective views of a further alternative embodiment of the present invention for fishbowl stand in the form of a wizard.
Figure 7B:
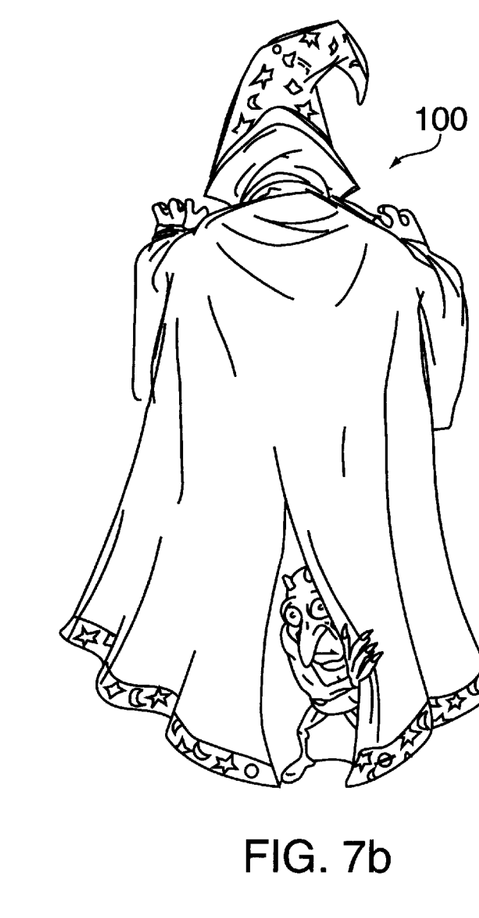

FIGS. 7a and 7b illustrate a fishbowl stand 100 in the form of a wizard which supports a glass fishbowl 220 (FIG. 7a). In this illustrated embodiment, a plurality of clawed feet 102 upwardly extend around the sides of fishbowl 220 to retain fishbowl 220 in a stable and secure position.

From the present description, it will be appreciated to one skilled in the art that the decorative fishbowl stands of the present invention can be in the form of other three-dimensional landscapes and/or other pictorial representations or simulations of objects, scenes, individuals, etc. In addition, the fishbowl stands can include two or more fish bowls in either side by side relation or in which the fishbowls are disposed at different respective elevations.

From the present description, it will also be appreciated that the base need not extend across the entire bottom surface in order to provide support on a generally flat surface. For example, a portion of the base can be cut away so as to be visible therethrough. In addition, the base can be hollow so that the outer edges of the base provide the necessary support.

While the fishbowl stand of the present invention allows a fishbowl to be removably place thereon, from the present description it is appreciated that the upwardly extending portion can be provided with locking means, e.g., a releasable clip which attaches to the top of the fishbowl, to aid in securely retaining a fishbowl on the fishbowl stand.

Desirably, the fishbowl stands of the present invention are fabricated from a plastic or polymeric material and integrally formed as a single unit. Although, the illustrated fishbowl in FIG. 2 is shown as being hollow in cross-section, it is appreciated that the fishbowl stand can be solid. In addition, the outer surface of the illustrated fishbowl stands are suitably painted to more accurately represent and simulate various three-dimensional, pictorial representations.

Thus, while only several embodiments of the present invention have been shown and described, from the present description it is appreciated that many changes and modifications may be made thereunto without departing from the spirit and scope of the invention.

What is claimed is:

1. A decorative fishbowl stand for removably supporting a removable, generally spherical fishbowl having a flat bottom and an open top, said stand comprising:

a generally flat base, a generally circular-shaped, flat support surface disposed parallel to and spaced-apart and elevated from said base for supporting at least a portion of the bottom of the fishbowl in an upright level manner, and at least one upwardly extending portion attached to said base which is positioned and dimensioned to extend about and around a lower side portion of the fishbowl placed on said support surface and at least one upwardly extending portion attached to said base which is positioned and dimensioned to extend about and around an upper side portion of the fishbowl placed on said support surface, wherein at least one of said base and said upwardly extending portions simulate a three-dimensional pictorial representation in which the fishbowl placed on said support surface is incorporated.

2. The fishbowl stand according to claim 1, further comprising a non-slip material disposed on said base.

3. The fishbowl stand according to claim 1, wherein said at least one upwardly extending portion extends above a top of the fishbowl.

4. The fishbowl stand according to claim 1, wherein said at least one upwardly extending portion has a surface which conforms to the side portion of the fishbowl.

5. The fishbowl stand according to claim 1, wherein said base and said at least one upwardly extending portion are generally hollow.

6. The fishbowl stand according to claim 1, wherein said base and said at least one upwardly extending portion are fabricated from a plastic material.

7. The fishbowl stand according to claim 1, wherein said three-dimensional representation is in the form of a landscape setting.

8. The fishbowl stand according to claim 1, wherein said three-dimensional representation is in the form of a mermaid on the ocean bottom.

9. The fishbowl stand according to claim 1, wherein said three-dimensional representation is in the form of a Swiss mountain village.

10. The fishbowl stand according to claim 1, wherein said three-dimensional representation is in the form of a lighthouse.

11. The fishbowl stand according to claim 1, wherein said three-dimensional representation is in the form of a pagoda.

12. The fishbowl stand according to claim 1, wherein said three-dimensional representation is in the form of a representation of an individual.

13. The fishbowl stand according to claim 1, wherein said three-dimensional representation is in the form of a wizard.

14. A combination decorative fishbowl stand and removable fishbowl, comprising:

a generally spherical fishbowl having a flat bottom and an open top; and a fishbowl stand having a generally flat base, a generally circular shaped, flat support surface disposed parallel to and spaced-apart and elevated from said base for supporting at least a portion of the bottom of the fishbowl in an upright level manner and at least one upwardly extending portion attached to said base which is positioned and dimensioned to extend about and around a lower side portion of the fishbowl placed on said support surface and at least one upwardly extending portion attached to said base which is positioned and dimensioned to extend about and around an upper side portion of the fishbowl placed on said support surface, wherein at least one of said base and said upwardly extending portions simulate a three-dimensional pictorial representation in which the fishbowl placed on said support surface is incorporated.

15. The combination according to claim 14, wherein said fishbowl comprises plastic.

16. The combination according to claim 14, wherein said fishbowl comprises glass.

\* \* \* \* \*